United States Patent
Andermo et al.

[11] Patent Number: 5,998,990
[45] Date of Patent: Dec. 7, 1999

[54] PITCH-COMPENSATED INDUCED CURRENT POSITION TRANSDUCER

[75] Inventors: Nils Ingvar Andermo, Kirkland; Karl G. Masreliez, Bellevue, both of Wash.

[73] Assignee: Mitutoyo Corporation, Kawasaki, Japan

[21] Appl. No.: 08/916,429

[22] Filed: Aug. 25, 1997

[51] Int. Cl.$^6$ ............... G01B 7/02; G01B 7/14; G01D 5/20
[52] U.S. Cl. ............... 324/207.12; 324/207.17; 324/207.24; 336/45; 340/870.32
[58] Field of Search ........... 324/207.12, 207.15–207.19, 324/207.24; 336/45, 130, 131, 136; 340/870.32, 870.33, 870.35, 870.36; 341/15; 318/653

[56] References Cited

U.S. PATENT DOCUMENTS

| | | |
|---|---|---|
| 4,959,615 | 9/1990 | Andermo . |
| 5,804,963 | 9/1998 | Meyer ................................ 324/207.17 |
| 5,841,274 | 11/1998 | Masreliez et al. ................... 324/207.17 |

FOREIGN PATENT DOCUMENTS

WO 97/19323   5/1997   WIPO .

Primary Examiner—Gerard Strecker
Attorney, Agent, or Firm—Oliff & Berridge, PLC

[57] ABSTRACT

A pitch-compensated induced current position transducer includes a scale having a plurality of scale elements arranged along a measuring axis and a read head positioned adjacent to and movable relative to the scale. The read head has a transmitter winding that generates a changing magnetic field and at least one receiver winding. One of the transmitter winding and receiver winding is formed from a spatially modulated section having an associated phase. The spatially modulated section has flux coupling areas distributed relative to a plurality of polarity zones. The spatially modulated section has at least one pitch balancing section. In one type of pitch balancing section the positive polarity winding loops and the negative polarity winding loops have their centroid axes aligned. The total flux coupling area in at least one polarity zone may optionally be different than the total flux coupling area in an adjacent polarity zone while the total negative flux coupling area remains equal to the total positive flux coupling area. In general, the pitch balancing sections are configured so that the overall centroids of all spatially modulated sections are aligned along the measuring axis. The distribution of the flux coupling area may be symmetrical.

21 Claims, 10 Drawing Sheets

DISPLACEMENT OF
CENTROID

PITCH-COMPENSATED INDUCED CURRENT POSITION TRANSDUCER

BACKGROUND OF THE INVENTION

1. Field of the Invention

This invention relates to sensing movement or position between two members by means of signals induced by magnetic fields. More particularly, this invention is directed to an induced current position transducer that compensates certain potential signal errors for a read head that is not perfectly parallel to a scale member.

2. Description of Related Art

Various movement or position transducers are currently available, such as optical, capacitive, magnetic and inductive transducers. These transducers often involve placing a transmitter and a receiver in various geometric configurations to measure movement between two members of the transducer.

Optical, capacitive, and magnetic transducers, are sensitive to contamination. Therefore, using such transducers in most manufacturing or shop environments is impractical. Using such transducers in a shop environment requires expensive and sometimes unreliable environmental seals or other methods of encapsulating the transducer to keep dust, oils and ferromagnetic particles from contaminating the transducer.

Pending U.S. patent application Ser. No. 08/441,769, filed May 16, 1995, and herein incorporated by reference in its entirety, describes an induced current position transducer usable in high accuracy applications. Pending U.S. patent application Ser. Nos. 08/645,483 and 08/645,490, both filed May 13, 1996, and both herein incorporated by reference, describe incremental position inductive calipers and linear scales, including signal generating and processing circuits. Pending U.S. patent application Ser. No. 08/788,469, now U.S. Pat. No. 5,886,519, Ser. No. 08/790,494, now U.S. Pat. No. 5,841,274, and Ser. No. 08/790,459, now U.S. Pat. No. 5,894,678, all filed on Jan. 29, 1997, each herein incorporated by reference, describe absolute position inductive calipers and electronic tape measures using this induced current transducer.

This induced current position transducer employs two members that are movable relative to each other. A read head contains an active transmitter for generating a changing magnetic field and a passive receiver for receiving and sensing the field and producing a receiver output signal. A scale includes a plurality of flux modulators. The flux modulators modulate the magnetic field, and thus the induced current in the receiver, depending on the position of the scale relative to the read head.

The transmitter includes a field source that produces a changing magnetic flux through a flux region. The receiver includes a receiver winding arranged in a prescribed pattern of flux-receiving areas along a measuring axis and within the flux region. The receiver winding passively generates a signal in response to the sensed changing magnetic flux. The amplitude and polarity of this signal is a function of the position of the read head relative to the scale. The receiver winding is formed by crossing a conductive element over itself at predetermined intervals to approximate a sinusoidal wave that reverses at one end. In this manner, the receiver winding has adjacent loops having alternating clockwise and counter-clockwise orientations. The magnetic field generated by the transmitter that passes through these loops with alternating orientations will generate EMFs having alternating polarities.

Alternatively, with suitable signal processing such as that detailed in the other U.S. patent applications incorporated herein, the transmitter and receiver/sensor functions may be switched. That is, the transmitter winding may be formed by crossing a conductive element over itself at predetermined intervals to have adjacent loops with alternating clockwise and counter-clockwise orientations. The magnetic fields generated by each of these loops will have alternating polarities. The receiver in this case is a simple loop.

The scale includes a plurality of flux modulators that are regularly positioned at a predetermined interval along the scale. As the scale is moved along the read head, the flux modulators move within the flux region to modulate the magnetic flux proximate to those flux modulators. The flux modulators within the flux region vary the induced current and thus the signal generated by the receiver winding will be a function of the relative position between the read head and the scale.

The induced current transducer, and the calipers, linear scales and electronic tape measures disclosed in these pending U.S. patent applications are readily manufactured using known printed circuit board technology. This transducer system is generally immune to contamination by particles, including ferromagnetic particles, oil, water, and other fluids.

Figure 1:
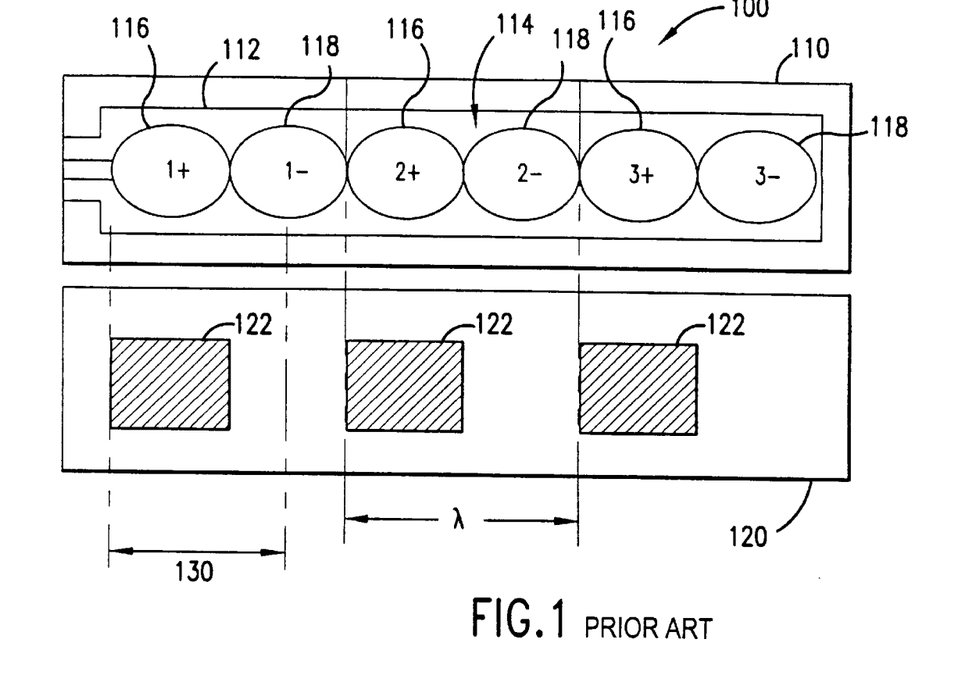
FIG. 1 is a plan view of a first known transducer layout.

FIG. 1 shows an induced current position transducer 100 having a read head 110 and a scale 120. The read head 110 includes a transmitter winding 112 and at least one receiver winding 114. The receiver winding 114 defines a plurality of positive polarity loops 116 and a plurality of negative polarity loops 118. The positive and negative polarity loops 116 and 118 extend along a measuring axis 130 of the read head 110 within the transmitter winding with a repetition rate corresponding to the scale wavelength $\lambda$.

The scale 120 includes a plurality of flux modulators 122. The flux modulators 122 can be either flux disrupters or flux enhancers. The flux modulators 122 are positioned at a pitch equal to the wavelength $\lambda$. Each flux modulator 122 extends along the measuring axis 130 approximately one-half of the wavelength $\lambda$ or less.

The flux disrupters are formed by a thin layer of conductive material. The changing magnetic field generated by the transmitter winding 112 generates eddy currents in the thin conductive layer. The eddy currents generate magnetic fields having a direction opposite that of the magnetic field generated by the transmitter winding 112. This reduces, or disrupts, the net magnetic field flux in the regions adjacent to the thin conductive layer flux disrupters.

The flux enhancers are formed by portions of a high magnetic permeability material. The magnetic field flux generated by the transmitter winding 112 preferentially passes through the high magnetic permeability flux enhancers. Thus, the magnetic flux within the flux enhancers is relatively denser, while the magnetic flux in areas laterally adjacent to the flux enhancers is relatively less dense.

In either case, the flux modulators spatially modulate the magnetic flux generated by the transmitter winding and the effective flux coupling between the transmitter and the receiver. It should be appreciated that the flux modulators 122 can indicate an alternating arrangement of flux disrupters or flux enhancers. It should also be appreciated that any of the read head layouts and scale layouts disclosed in the incorporated U.S. Patent Applications can be used with the pitch compensation technique of this invention.

When the read head 110 is positioned over, approximately parallel to, and in proximity to the scale 120, the magnetic field generated by the transmitter winding 112 is modulated by the flux modulators 122. The modulated magnetic field induces a position dependent net EMF in the receiver winding 114.

Figure 2:
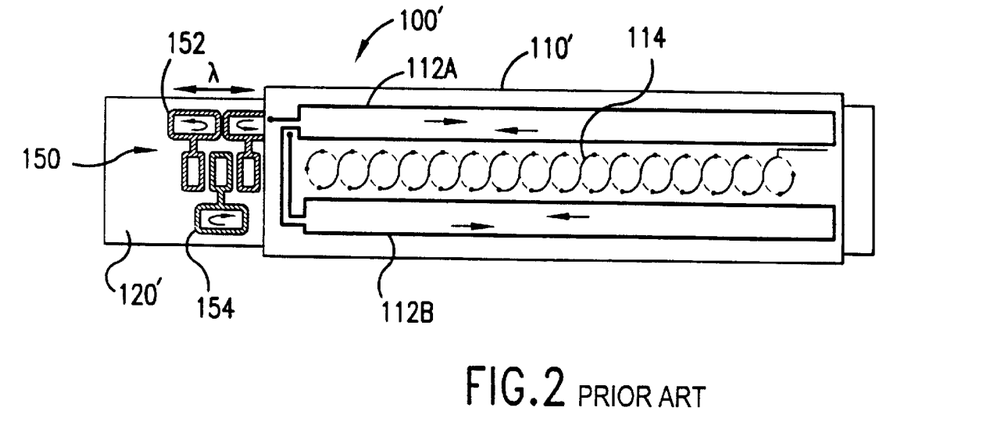
FIG. 2 is a plan view of a second known transducer layout.

As shown in FIG. 2, a second induced current transducer 100' does not have a transmitter winding that surrounds the receiver winding. Instead, this second induced current transducer has two transmitter windings 112A and 112B symmetrically placed outside of the receiver winding 114 and connected in series in such a way that the direct field from the transmitter windings 112A and 112B to the receiver winding 114 is minimized. On the scale 120 the flux modulators are replaced with loops 150 that transfer the field from the transmitter area to the area under the receivers.

The current in the upper transmitter loop 112A flows clockwise, causing an induced current in the underlying scale loops 152 that flows counterclockwise. The current in the lower transmitter loop 112B flows counterclockwise, inducing a current that flows clockwise in the underlying scale loops 154. Thus, the alternating loops on the scale carry currents of alternating direction. An example of this second induced current transducer is described in U.S. patent application Ser. No. 08/834,432, filed Apr. 16, 1997, and herein incorporated by reference in its entirety.

In a manner similar to the transducer of FIG. 1, the transmitter and receiver/sensor functions may be switched. In this case, the transmitter may comprise the winding 114 that has alternating polarity loops while the receiver may comprise the winding 112.

When the read head 110' is moved over the scale 120' along the measurement direction, the EMF induced in the receiver winding 114 will alternate as a periodic function of the relative position between the two members with a wavelength equal to the distance between equal polarity loops on the scale. This second induced current transducer 100' is driven with the same kind of signal and the receiver signals are processed in the same way as in the first induced current transducer shown in FIG. 1. Thus, the pitch compensation principles in this invention are equally applicable to the first and second induced current transducers 100 and 100'.

Figure 3:
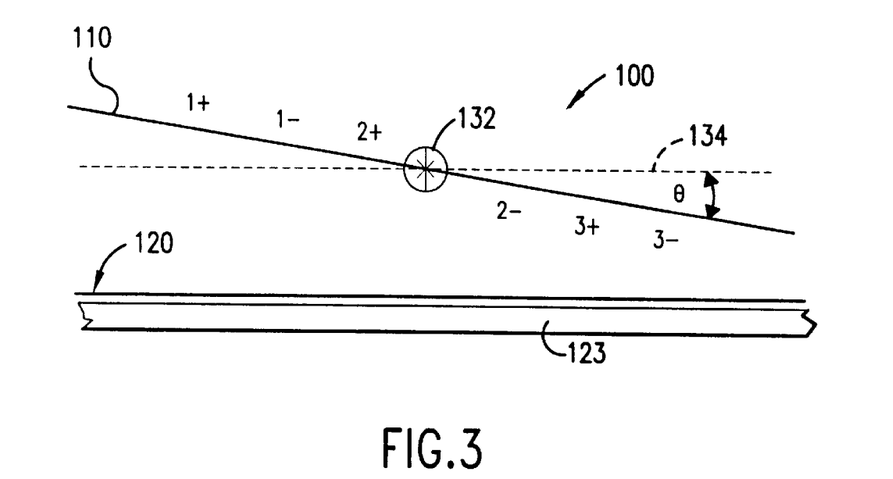
FIG. 3 is a side elevation view of a read head, a scale and a conductive scale support, with the read head positioned at a pitch relative to the scale and support.

These transducers and other similar types of inductive transducers suffer from undesired errors when the active read head is misaligned relative to the passive scale. One aspect of this misalignment is "pitch". As shown in FIG. 3, in pitch, the read head 110 is rotated from a position parallel to the scale 120 about a pitch axis 132. The pitch axis 132 lies in the plane of the read head 110 and is substantially perpendicular to a measuring axis of the transducer. Thus, one end of the read head will be closer to the scale than the other end of the read head.

The transducers of FIGS. 1 and 2 are shown with single receiver windings 118 and 114, respectively, for simplicity of description. However, practical devices more commonly have multiple receiver windings displaced from each other along the measuring axis, such as windings placed in quadrature, for detecting direction of motion and for other practical reasons. If the read head of one of these induced current transducers is pitched relative to the scale elements, two of the major types of signal errors that can occur are: 1) a net unbalance in the induced amplitudes in the positive and negative loops within a single receiver winding, and 2) a net unbalance in the output signal amplitudes between the multiple receiver windings of the transducers. The unbalanced output of the positive and negative loops within a single receiver winding creates an undesirable position insensitive "DC" offset within the receiver winding signal, and additionally creates an undesirable +/− modulation unbalance within the receiver winding. The different output between multiple receiver windings appears as an undesirable modulation amplitude mismatch between those receiver windings, and additionally, if the individual windings exhibit DC offset, as an undesirable DC offset mismatch between the receiver windings. It should be appreciated that the +/− modulation unbalance and the DC offset mismatch are generally significantly smaller in magnitude than the DC offset and the modulation amplitude mismatch, respectively.

When a conductive scale support material is used, as in a stainless steel caliper beam, the strength of the transmitted field is attenuated compared to when a non-conductive scale base is used. The strength of the transmitted field is attenuated because the transmission field sets up eddy currents in the conductive scale support that in turn induces a counter-acting field that reduces the strength of the transmission field. This effect reduces the strength of the response in the vicinity of each portion of the read head receivers to an extent that is dependent upon the gap between the read head and scale. Thus, this effect can distort the desired read head signal relationships when the read head is pitched relative to a conductive support.

The cross-talk from the transmission winding to a receiver winding is defined as the signal at the receiver winding terminal that is caused by the current directly induced by the transmitter field in the receiver windings independent of the flux modulators. In the first induced current transducer shown in FIG. 1, each sub-loop in the receiver windings is subject to a fairly strong directly induced current from the transmitter field. However, each receiver winding includes sub-loops that are wound in alternating directions that cause the induced currents to have alternating polarities. The resulting signals at the terminals of the receiver windings due to cross talk are thus nominally zero, because the number and size of positive and negative loops in each receiver winding are equal. However, balance between the positive and negative currents induced directly by the transmitter winding may be disturbed by an increase in the cross-talk caused by a pitch misalignment of the read head relative to a conductive plane. FIG. 3 illustrates why this happens.

In FIG. 3, read head 110 is positioned over a conductive plane 123, such as a conductive beam supporting the scale 120. Three sets of positive and negative loop pairs 1–3 of the receiver winding are positioned along the measuring axis. Because of the counteracting field generated by the eddy currents in the conductive base, the resulting field in the plane of the winding varies with the distance between the read head 110 and the scale 120. A pitch misalignment of the read head 110 induces an increase in the direct cross-talk between the transmitter winding and the receiver winding because one of the positive or negative loops will be, on average, closer to the conductive base than the other one of the positive and negative loops. In FIG. 3, the negative loops are, on average, closer to the conductive base than the positive loops. Therefore, an imbalance is created because a smaller net transmitter flux passes through the negative loops than through the positive loops. This imbalance shows up as a DC offset in the receiver signal.

Figure 4:
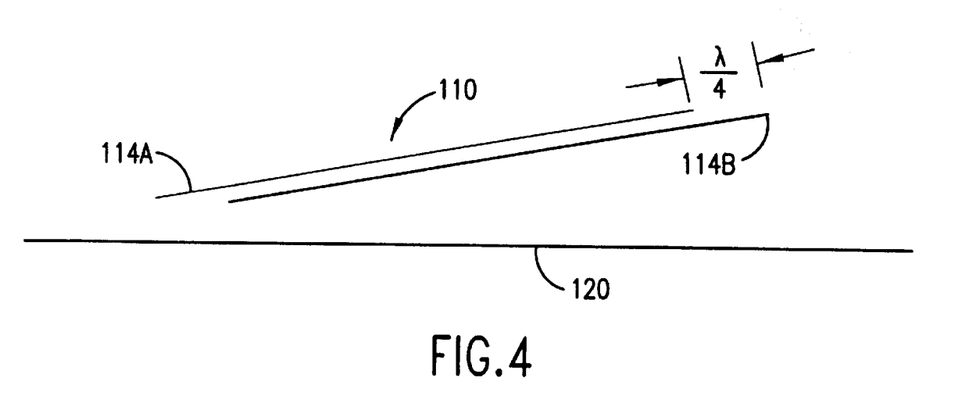
FIG. 4 is a side elevation view of a read head and a scale, with the read head having two similar windings offset from each other along the measuring axis, and positioned at a pitch relative to the scale.

If two receiver windings are present and offset from each other along the measuring axis as shown in FIG. 4, an additional problem occurs in that the cross-talk offset will be different in each receiver winding, due to their differing average gap distances. That is, there will be a DC offset mismatch between the two receiver windings. Also, the modulation amplitude in the two receiver windings will be different because of the differing average gap distance.

In the second induced current transducer shown in FIG. 2, the problem with the crosstalk offset is smaller, because the transmitter does not surround the receiver. Furthermore, the direct transmitter field through the receiver windings is nominally balanced by the interaction of the two transmitter windings. However, if this balance is not perfect, or disturbed by a roll misalignment of the read head relative to the scale, a cross-talk offset is created. Roll is a rotation around an axis parallel to the measurement axis.

As described in the incorporated application Ser. Nos. 08/441,769; 08/645,483 and 08/645,490, at least two receiver windings are usually required to unambiguously determine position and movement direction. When multiple receiver windings are present in the first and second transducers, the position is calculated from the relation of signals from these windings.

If the receiver windings are identical but offset from each other in the measurement direction, pitch misalignment of the read head relative to the scale of the transducer causes a modulation amplitude mismatch between the output signals of the two receiver windings. FIG. 4 shows the relative positions of two receiver windings 114A and 114B within the first and second induced current transducers. The two receiver windings 114A and 114B lie in the same plane and are offset one quarter of a wavelength from each other to generate quadrature output signals. As shown in FIG. 4, a pitch misalignment brings the first receiver winding 114A closer to the scale 120 than the second receiver winding 114B. As a result, a modulation amplitude mismatch (signal amplitude mismatch) is created because the signal from the first receiver winding 114A is stronger than that of the second receiver winding 114B. This amplitude mismatch induces a measurement error. This problem exists equally in multiple winding versions of the first and second induced current transducers shown in FIGS. 1 and 2.

FIG. 3 also illustrates how a pitch misalignment generates +/− modulation unbalance in a receiver winding of the first induced current transducer 100 and the second induced current transducer 100'. In other words, within a single winding, the signal modulation of one loop polarity by the scale is larger than the signal modulation of the other loop polarity by the scale. In the first and second induced current transducers 100 and 100', the read heads 110 and 110' and the scales 120 and 120', respectively are preferably positioned perfectly parallel to each other. However, due to manufacturing errors and/or tolerances, and as various components of the first and second induced current transducers 100 and 100' wear, the read heads 110 and 110' and the scales 120 and 120' may become relatively misaligned, as shown in FIG. 3. In particular, the read heads 110 and 110' and scale 120 become pitched by an angle θ about a pitch axis 132 from a perfectly parallel orientation indicated by a plane 134.

As shown in FIG. 3, as a result of the pitch, the "3−" negative polarity loop is positioned closest to the scale 120, while the "1+" positive polarity loop is positioned farthest away from the scale 120. Because different EMFs are induced in the receiver loops that are positioned farther away from the scale 120 than those that are closer, the magnitude of the EMF generated in the "1+" positive polarity loop is different than the magnitude of the EMF generated in the "1−" negative polarity loop. Similarly, the magnitude of the EMF generated in the "2−" negative polarity loop is different from the magnitude of the EMF generated in the "2+" positive polarity loop. This is true for each pair of adjacent loops across the read heads 110 and 110' along the measurement axis 130.

When FIG. 3 represents the first induced current transducer 100, the scale elements are flux modulators 122 and the modulation of the induced EMF in each loop will increase as the distance from the scale 120 decreases. Thus, the modulation of the EMF generated in the "1+" loop is less than the modulation of the EMF generated in the "1−" loop, and so on. The net effect is to increase the net modulation signal amplitude for the loop polarity that is on average closer to the scale due to pitch, which defines a +/− modulation unbalance due to the pitch.

When FIG. 3 represents the second induced current transducer 100', the scale elements represent the coupling loops 150. In this case, the inductive coupling provided by the coupling loops 150 between the transmitter winding and a particular loop of the receiver winding will be weaker as the distance from the scale member 120 to any portion of the read head 110' increases. The net effect is again to increase the modulation for the loop polarity that is on average closer to the scale due to pitch, which defines a +/− modulation unbalance due to the pitch. Thus, the read head winding 114 of the induced current transducer 100' shown in FIG. 2 will, in general, be pitch sensitive. It should be noted that the dual-polarity scale 120 shown in FIG. 2 overcomes this pitch sensitivity by theoretically eliminating DC components in the scale field which might interact with the pitch sensitivity of the read head winding 114. However, in general, other scales may be used in which there may exist a significant DC component in the scale field which introduces a DC component in the output signal from the winding 114 when the read head has a pitch misalignment relative to the scale. This creates an error in the output position signal when the processing electronics assumes no unbalance in the winding output signal.

Therefore, an induced current position transducer is needed that is accurate, inexpensive to manufacture and immune to contamination, and can produce substantially balanced signal components that are not adversely affected by pitch misalignment.

SUMMARY OF THE INVENTION

This invention provides a high accuracy induced current position transducer that inexpensively and effectively eliminates pitch-induced errors, yet is suitable for a wide variety of applications, is insensitive to contaminants such as oil and ferromagnetic particles, and is relatively inexpensive to manufacture.

This invention provides an induced current position transducer with at least one spatially modulated section that is either a magnetic field generator or a magnetic flux sensor, each spatially modulated section having a spatial phase. The spatially modulated section defines effective flux coupling areas distributed relative to a plurality of polarity zones that extend along the measuring axis, which define alternating polarity contributions to the position output signal. The spatially modulated section has at least one pitch-balancing section designed such that the centroid axis of the effective flux coupling areas making positive polarity contributions to the position output signal is aligned with the centroid axis of the effective flux coupling areas making negative polarity contributions to the position output signal. The total effective flux coupling area in negative polarity zones may also equal the total effective area of the flux coupling areas in positive polarity zones. Furthermore, the effective flux coupling area in at least one polarity zone may be different from the effective flux coupling area in an adjacent polarity zone, as a means to diminish certain signal errors due to pitch.

Each spatially modulated section has a defined centroid axis lying in a plane perpendicular to the measuring axis with its location along the measuring axis defined as follows: The location of the centroid axis is chosen such that when each incremental portion of all flux coupling areas is multiplied by the signed distance from that incremental portion to the centroid axis, the sum of all such products equals zero. The centroid axis of multiple windings may be aligned to eliminate certain measurement errors due to pitch.

This invention also provides an induced current position transducer using a receiver winding with loops having a symmetric distribution of polarities to further eliminate pitch-induced measuring errors. This is done by distributing the flux coupling areas in each pitch balancing section symmetrically about a plane of symmetry that is perpendicular to the measuring axis and that is located at the midpoint between the extrema along the measuring axis of the areas included in the pitch balancing section.

Various features and advantages of this invention will become apparent to those skilled in the art from studying the following detailed description of the presently preferred embodiments, together with the following drawings.

BRIEF DESCRIPTION OF THE DRAWINGS

The preferred embodiments of this invention will be described in detail, with reference to the following figures, wherein.

DETAILED DESCRIPTION OF THE PREFERRED EMBODIMENTS

Figure 5:
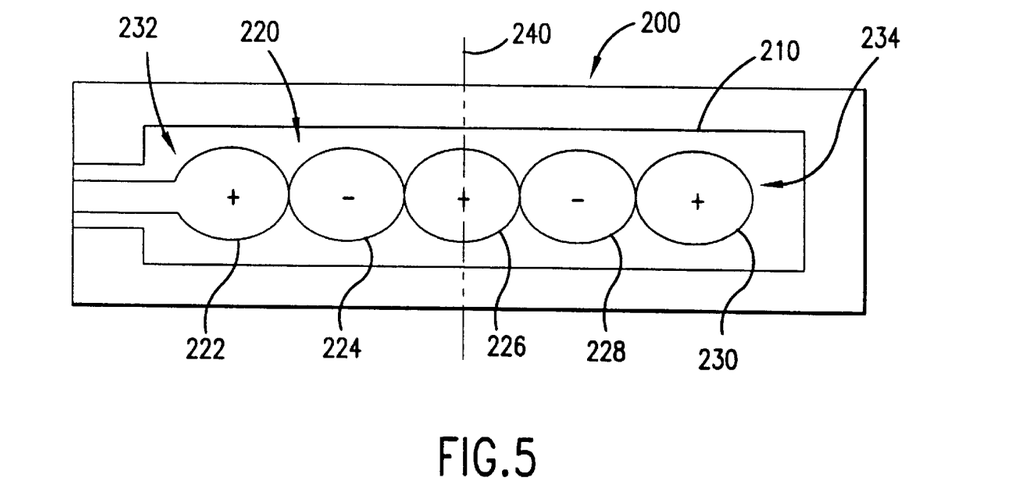
FIG. 5 is a plan view of a first embodiment of a pitch-compensated winding of this invention.

FIG. 5 shows a first embodiment of a pitch-compensated read head 200 of this invention. A single receiver winding is shown for simplicity. This read head 200 is usable in place of the read head 110 in the transducer 100. The read head 200 has a transmitter winding 210 and at least one receiver winding 220. The receiver winding 220 has five loops 222–230, or more generally, an odd number of loops, having polarities that are symmetrically arranged about an axis of symmetry 240. Three of the loops 222, 226 and 230 are positive polarity loops, while the remaining two loops 224 and 228 are negative polarity loops.

A pitch between the read head 200 and the scale 120 may cause a left end 232 of the receiver winding 220 to be positioned closer to the scale 120 than a right end 234 of the receiver winding. In this case, the first loop 222 is moved closer to a flux modulator 122. As a result, the flux modulator 122 modulates the magnetic field through the first loop 222 to a greater extent. Thus, the positive polarity EMF contributed by the first loop 222 is modulated to a greater extent than it would have been without the pitch. Similarly, the negative polarity loop 224 is pitched closer to the scale 120. Thus, the negative polarity EMF generated in the loop 224 is modulated to a greater extent than it would have been without the pitch. In contrast, the positive polarity loop 230 and the negative polarity loop 228 are farther from the scale 120 than they would have been without the pitch. Thus, the negative polarity EMF generated in the loop 228 and the positive polarity EMF generated in the loop 230 are modulated to a lesser extent than they would have been without the pitch. Because portions of the positive polarity loop 226 are both closer to and farther from the scale 120, the EMF generated in it is substantially unaffected by the pitch. Thus, the greater EMF modulation in the positive loop 222 is compensated by an equally lesser modulation in the positive polarity loop 230. Similarly, the greater EMF modulation in the negative loop 224 is compensated by an equally lesser modulation in the negative loop 228. Thus, net amplitude and offset output signal of the symmetrical loop arrangement of FIG. 5 is approximately unchanged at various pitch misalignments. In general, these pitch-compensating attributes are provided when the positive polarity loops of the receiver winding 220 and the negative polarity loops of the receiver winding 220 have their centroid axes aligned. The positive polarity loops of the receiver winding 220 and the negative polarity loops of the receiver winding 220 each have a defined centroid axis lying in a plane perpendicular to the measuring axis. The location of the centroid axis along the measuring axis is chosen such that when each incremental portion of all flux coupling areas of the same polarity is multiplied by the signed distance from that incremental portion to the centroid axis, the sum of all such products equals zero.

It should be understood throughout this application, that when multiple flux receiver (or flux generator) loops overlap, the shared area must be considered independently for each loop when calculating the centroid axes and the effective flux area discussed herein. This is a conventional method for considering magnetic flux coupling to windings.

The first embodiment of the pitch-compensated receiver winding shown in FIG. 5, has one disadvantage: the number of loops of one polarity are greater than the number of loops of the other polarity. That is, the receiver winding 200 has a positive DC bias in the output signal because there are three positive polarity loops, but only two negative polarity loops. Thus, even though compensating for certain pitch-induced errors, this design produces other undesirable errors and sensitivities. This DC bias caused by the polarity unbalance is generally minimized by increasing the total number of loops. However, this does not completely eliminate the bias.

Figure 6:
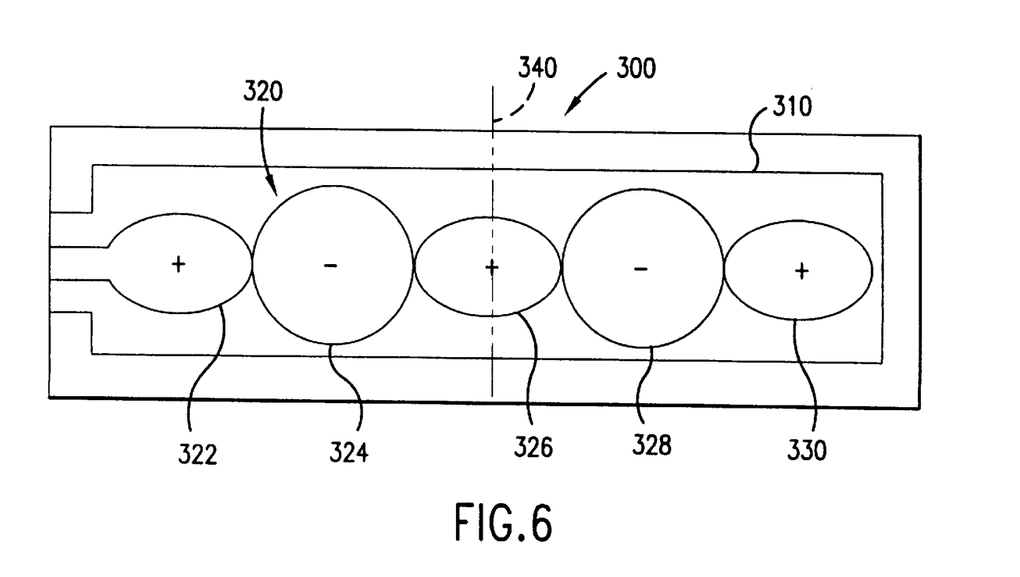
FIG. 6 is a plan view of a second embodiment of a pitch-compensated winding of this invention.

FIG. 6 shows a second embodiment of a pitch-compensated read head 300. In the read head 300, the aforementioned bias is eliminated by modifying the positive and negative polarity loops so that the positive polarity loops 322, 326 and 330 and the negative polarity loops 324 and 328 circumscribe the same total area. That is, the total area circumscribed by the positive polarity loops is equal to the total area circumscribed by the negative polarity loops. The EMF contribution of a loop is proportional to the area the loop encompasses in a plane perpendicular to a changing magnetic flux. By balancing the total circumscribed areas of all the positive polarity loops and the negative polarity loops and by symmetrically arranging the polarity loops about a centroid axis 340, the aforementioned signal bias, as well as pitch sensitivity of the output signal, is substantially eliminated.

It should be recognized that the receiver winding 320 of FIG. 6 also has a drawback. The negative polarity loops 324 and 328 of the receiver winding 320 have portions closer to the transmitter winding 310 than the positive polarity loops 322, 326 and 330. The magnetic field generated by the transmitter winding 310 decreases rapidly as the distance from the transmitter winding 310 increases. The EMF output of a loop is directly proportional to the magnetic flux circumscribed by the loop. Therefore, both the size of a loop and its proximity to the transmitter winding 310 affects the EMF generated in that loop. The positive polarity loops 322, 326 and 330 and the negative polarity loops 324 and 328 circumscribe the same total area. However, because the positive polarity loops 322, 326, and 330 do not circumscribe the same amount of magnetic flux as the negative polarity loops 324 and 328, there is still a net bias in the receiver winding 320.

Additionally, the read head 300 having different-sized receiver loops may create output signal harmonics that create measurement errors.

Figure 7:
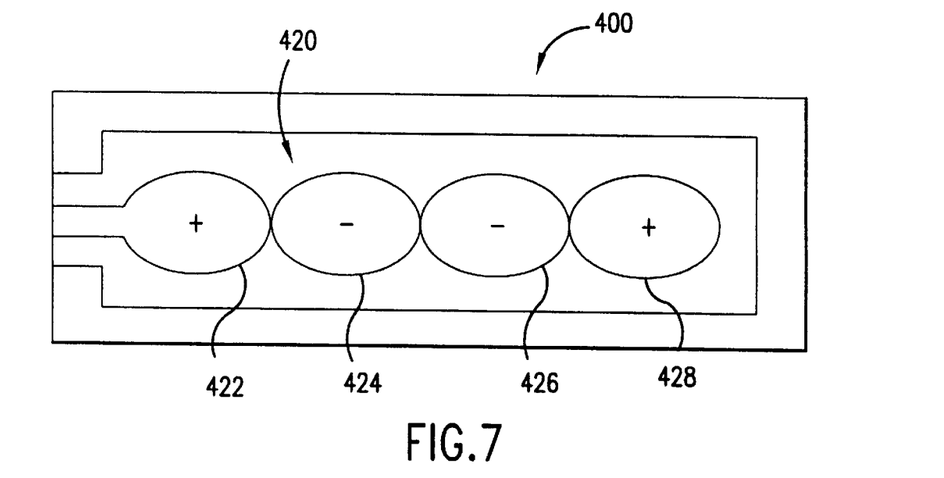
FIG. 7 is a plan view of a third illustrative embodiment of a pitch-compensated winding.

A third illustrative embodiment of a pitch-compensated read head is shown in FIG. 7. In the read head 400 of FIG. 7, the receiver winding 420 has equal numbers of positive polarity loops 422 and 428 and negative polarity loops 424 and 426. This provides an unbiased signal. The symmetrical arrangement of the positive and negative polarity loops ensures that any measurement errors due to pitch will be minimized or eliminated. However, if the flux modulators 122 are arranged on the scale 120 as shown in FIG. 1, the receiver winding 400 will be of little use. In FIG. 1, the flux modulators 122 are positioned along the scale 120 at an interval of one wavelength $\lambda$. If a scale 120 having this flux modulator pattern were positioned over the receiver winding 400, the output of the receiver winding 400 would be position-insensitive. That is, the EMF output would not change regardless of the relative position of the read head and scale. Thus, the scale 120 would have to be modified so that the scale elements and the wavelength of those scale elements are twice the length shown in FIG. 1, and even so the transducer would have a limited range of travel. Thus, this case is illustrative of yet another pitch-compensating winding technique, but is of limited utility.

Figure 8:
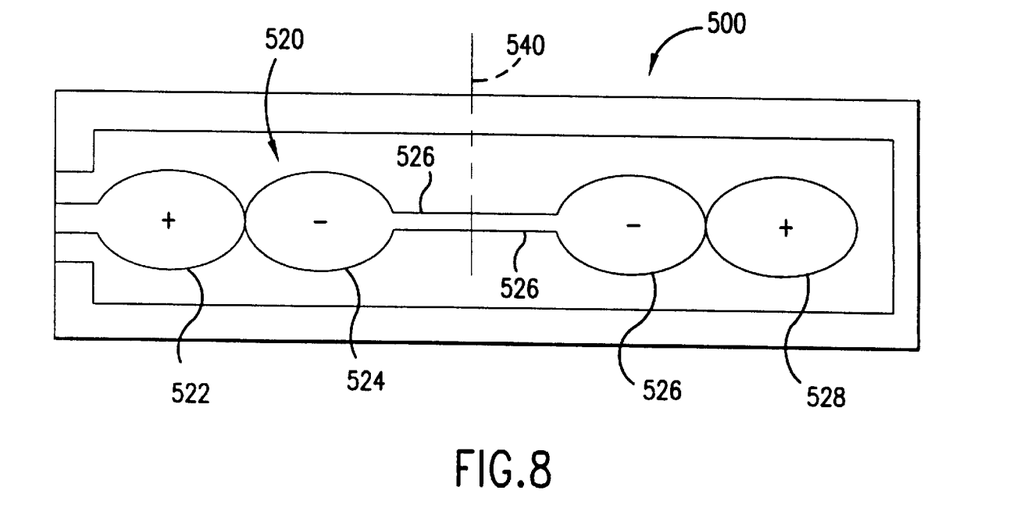
FIG. 8 is a plan view of a fourth preferred embodiment of the pitch-compensated winding of this invention.

Another read head 500 of this invention is shown in FIG. 8. The read head 500 solves the problems of the previous embodiments by providing a preferred receiver winding 520 having an equal number of loops of each polarity. However, in the receiver winding 520, the same polarity loops positioned closest to the axis of symmetry 540 are spaced a distance of one half wavelength (i.e., $\lambda/2$) from each other. This is equivalent to replacing the central loop 226 in FIG. 5 with two straight wires 526, so that the negative polarity loops 524 and 526 are connected directly to each other. In addition, the wires 526 should be as close as possible to each other, so that they enclose a minimal area. Thus, the wires 526 are preferably aligned with each other on opposite sides of the printed circuit board forming the read head 500. This ensures the wires 526 enclose zero area.

In this manner, the scale can use the flux modulator pattern shown in FIG. 1 and the receiver winding 520 will have the desired periodic output when the scale moves, while eliminating the previous sources of DC bias and compensating for any pitch effects on the signal from the individual winding.

Figure 9:
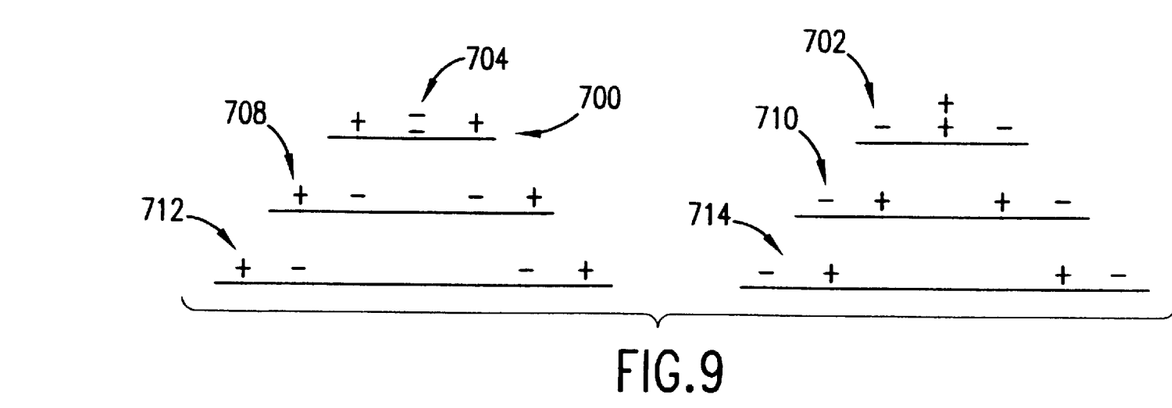
FIG. 9 is a side view of a first group of pitch balanced windings of this invention.

FIG. 9 shows some variations of preferred balanced windings. Each positive and negative sign represents one "unit" of effective flux coupling area, with the sign determined by whether the unit lies in a positive or negative polarity zone.

As used herein, "polarity zones" are mental constructs useful in analyzing and describing a pitch-compensated transducer layout. The positive polarity zones of a spatially modulated flux receiver (or flux generator) are assumed herein to contain windings or flux sensors which all make a positive polarity contribution to the output signal. The negative polarity zones of a spatially modulated flux receiver (or flux generator) are assumed herein to contain windings or flux sensors which all make a negative polarity contribution to the output signal. It should be noted that one could of course intentionally violate these assumptions, and include windings or sensors of the opposite polarity in some polarity zones. These windings or sensors will hereafter be called "anti-sense". In such case, the principles and claims described herein can still be applied, but such anti-sense windings or sensors should be considered to have "negative effective area". That is, when computing centroids, effective flux area, and total effective flux area herein, anti-sense areas should be considered to carry a negative sign. Thus, for example, if a polarity zone includes a winding loop of the expected polarity contribution enclosing an area, as well as an anti-sense winding loop enclosing equivalent area, then the net effective flux area in that zone is zero (as if no loops were present). In preferred embodiments of this invention, polarity zones are assumed to be alternately positive and negative along the measuring axis, and to have a length and pitch equivalent to the scale elements.

The first row of FIG. 9 shows a compact form of balanced winding 700 where the loop in the center polarity zone 704 is made to have double the weight compared to the rest of the loops by encircling double the flux compared to the rest of the loops. In other words, the winding 700 has its flux coupling unit area doubled at the negative polarity zone 704. This is preferably accomplished by letting the loop in the center polarity zone 704 have double the number of turns compared to the rest of the loops. It can also be accomplished by letting the loop in the center polarity zone 704 encircle a larger area than the rest of the loops, but drawbacks to this method are noted above. Other balanced windings can be obtained by inserting a space corresponding to an odd number of half-wavelengths (or odd number of loops) at the center of the winding, as shown in the second and third rows of FIG. 9. The windings 700, 708 and 712 all have the same spatial phase position and aligned centroid axes in FIG. 9. The windings 702, 710 and 714 all have 180 degree spatial phase shift compared to the windings 700, 708 and 712, respectively, if the centroids of the windings 702, 710 and 714 are centered at the same position as the centroids of the windings 700, 708 and 712. The centroid axes of 702, 710 and 714 are aligned in FIG. 9.

Figure 10:
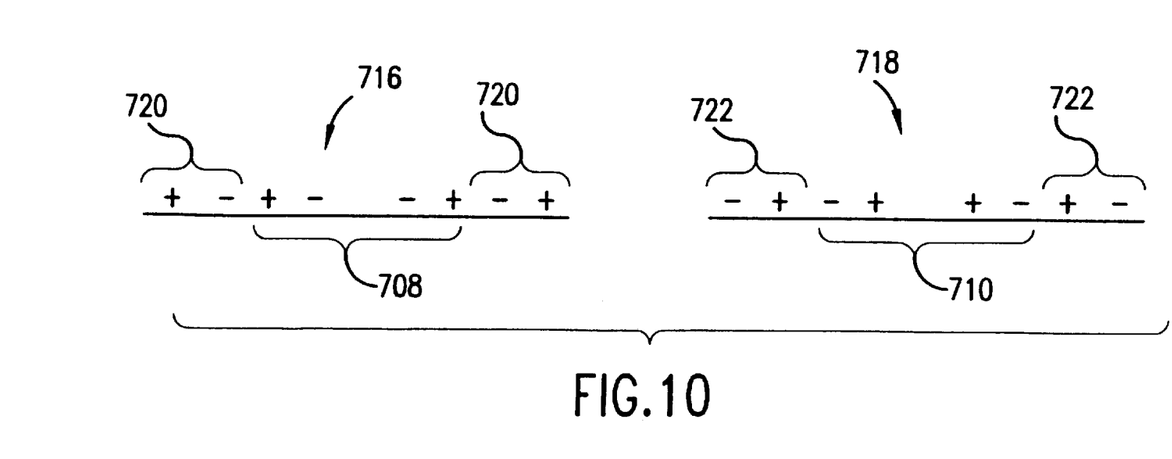
FIG. 10 is a side view of a second group of pitch balanced windings of this invention.

As shown in FIG. 10, windings can be lengthened by replicating loop pairs at the ends of the windings 708 and 710, such as replicated pairs 720 and 722. FIG. 10 shows two examples 716 and 718 where one loop pair has been added at each end of the windings 708 and 710 of the second row of FIG. 9. More loop pairs can be added at the ends as needed without disturbing the balance of the winding.

Figure 11:
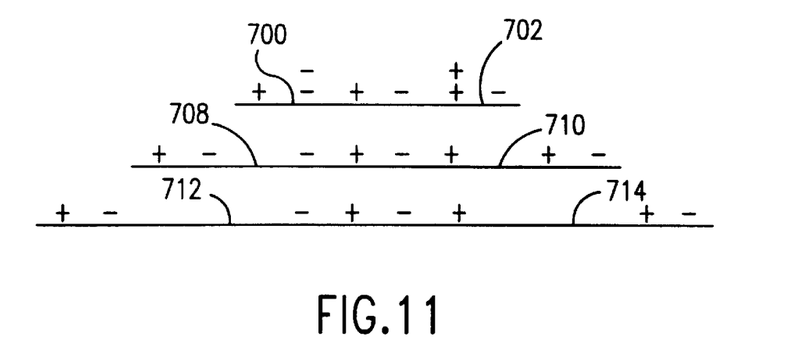
FIG. 11 is a side view of a third group of pitch balanced windings of this invention.
Figure 12:
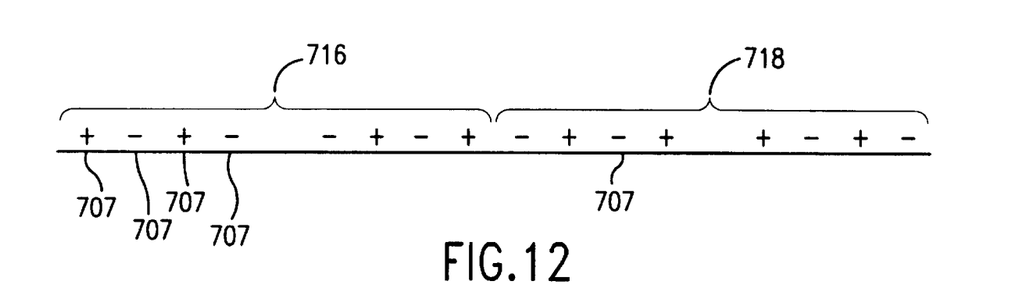
FIG. 12 is a side view of another pitch balanced winding of this invention.

FIG. 11 shows examples of how new types of balanced windings can be obtained by connecting any of the balanced windings of FIGS. 9 and 10 to each other with serial connections, end-to end. In FIG. 11 the winding of each row is obtained by connecting together the windings of the corresponding row of FIG. 9. In the same way, FIG. 12 shows the windings of FIG. 10 connected to form yet another type of balanced winding. Note that the pattern of positive and negative polarity zones 707 is continuous at the point where the windings are joined.

In general, a winding that is balanced for offset can be created by connecting together shorter, offset-balanced windings.

Figure 13:
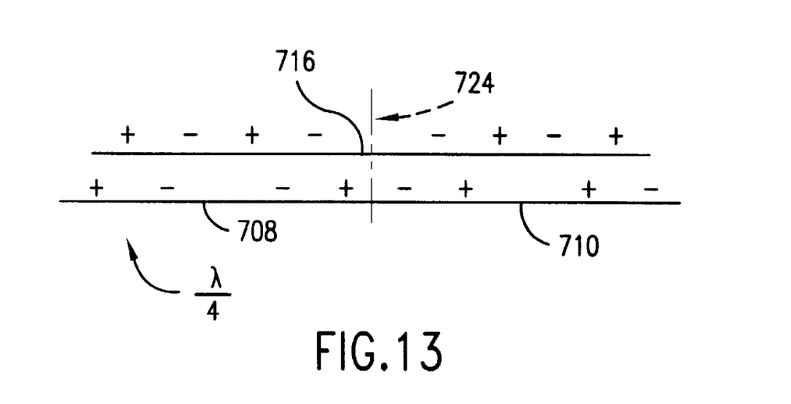
FIG. 13 is a side view of a pair of pitch-balanced windings of this invention which provide a different spatial phase for each winding, while aligning their centroid axes to eliminate both offset and amplitude mismatch sensitivity to pitch.

To eliminate the pitch-induced signal amplitude mismatch error, the windings have to be positioned so that they, physically, have aligned centroid axes while they electrically maintain their spatial phase difference. This is achieved if a winding of the type shown in FIG. 10 is combined with a winding of the type shown in FIG. 11. FIG. 13 shows an example where the first winding of FIG. 10 is combined with the second winding of FIG. 11. The windings have aligned centroids at 724 while maintaining a ¼-wavelength spatial phase shift between them. Note that the polarity zones (outlined by tick marks along the windings) are shifted by ¼-wavelength between the windings. Thus, these windings constitute a preferred set of quadrature windings which are insensitive to several potential types of pitch-induced signal errors.

Figure 14A:
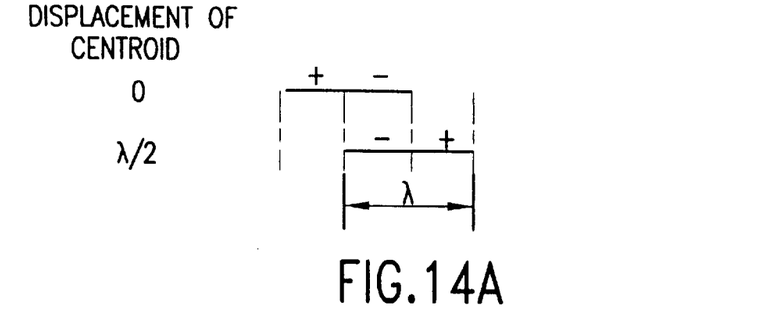
FIGS. 14A–C show side views of several winding configurations illustrating different centroid displacements without changing the spatial phase of the configurations.
Figure 14B:
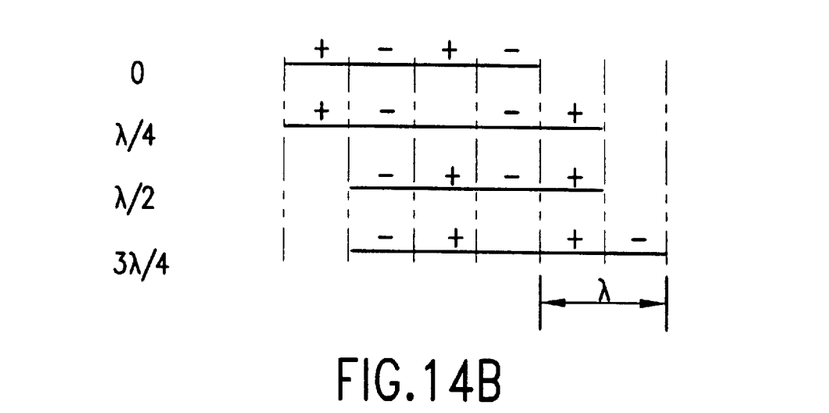
Figure 14C:
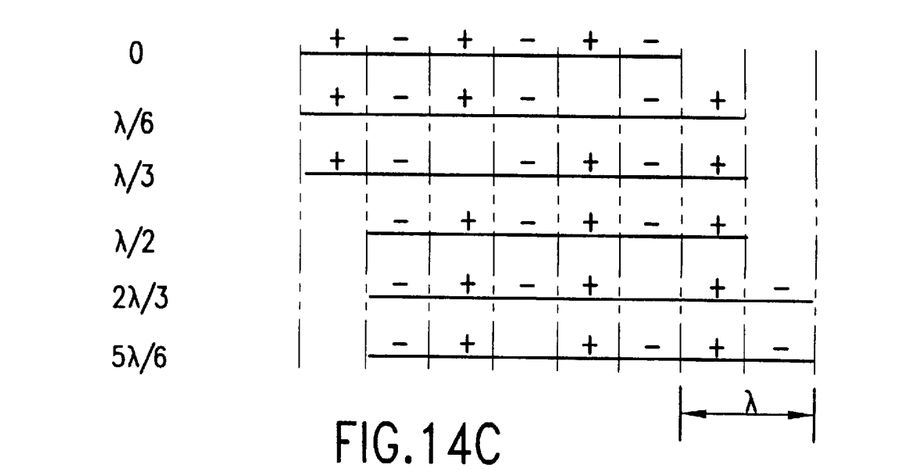

A transducer of the kind shown in FIG. 13 is balanced to eliminate both offset and amplitude mismatch errors when there is a pitch misalignment between the windings and the plane of the scale elements and any conductive plane under the scale. If only the pitch-balancing of the amplitudes of multiple windings with different spatial phases is of interest, as, for instance, in a case where a FIG. 2 type transducer is used, then windings according to FIGS. 14A–C can be used. Some of these windings are not pitch-balanced for errors within the individual windings. FIGS. 14A–C shows some examples of how to move the centroid axis of a winding without changing the spatial phase of the winding. The centroid axis is the axis of rotation where pitch about that axis does not significantly change the overall signal amplitude of the winding. Note that the polarity zones of all windings are aligned, indicating the same spatial phase for all windings of FIGS. 14A–C.

Loops without a plus or a minus sign are empty spaces between winding groups. In other words, electrical connections may bridge these zones to connect adjacent loops, but no flux coupling areas exist in that particular polarity zone. For loops of uniform area, the centroid of a winding is obtained by assigning the same unit weight to each loop pair of the winding (each pair contains one plus loop and one minus loop) and then calculating the balance point as for a collection of masses. From FIG. 14 one can deduce the following rule: The centroid can be moved in steps of 1/N of a wavelength $\lambda$, where N is the number of loops of the winding (N is equal to double the number of wavelengths contained in the winding).

Figure 15:
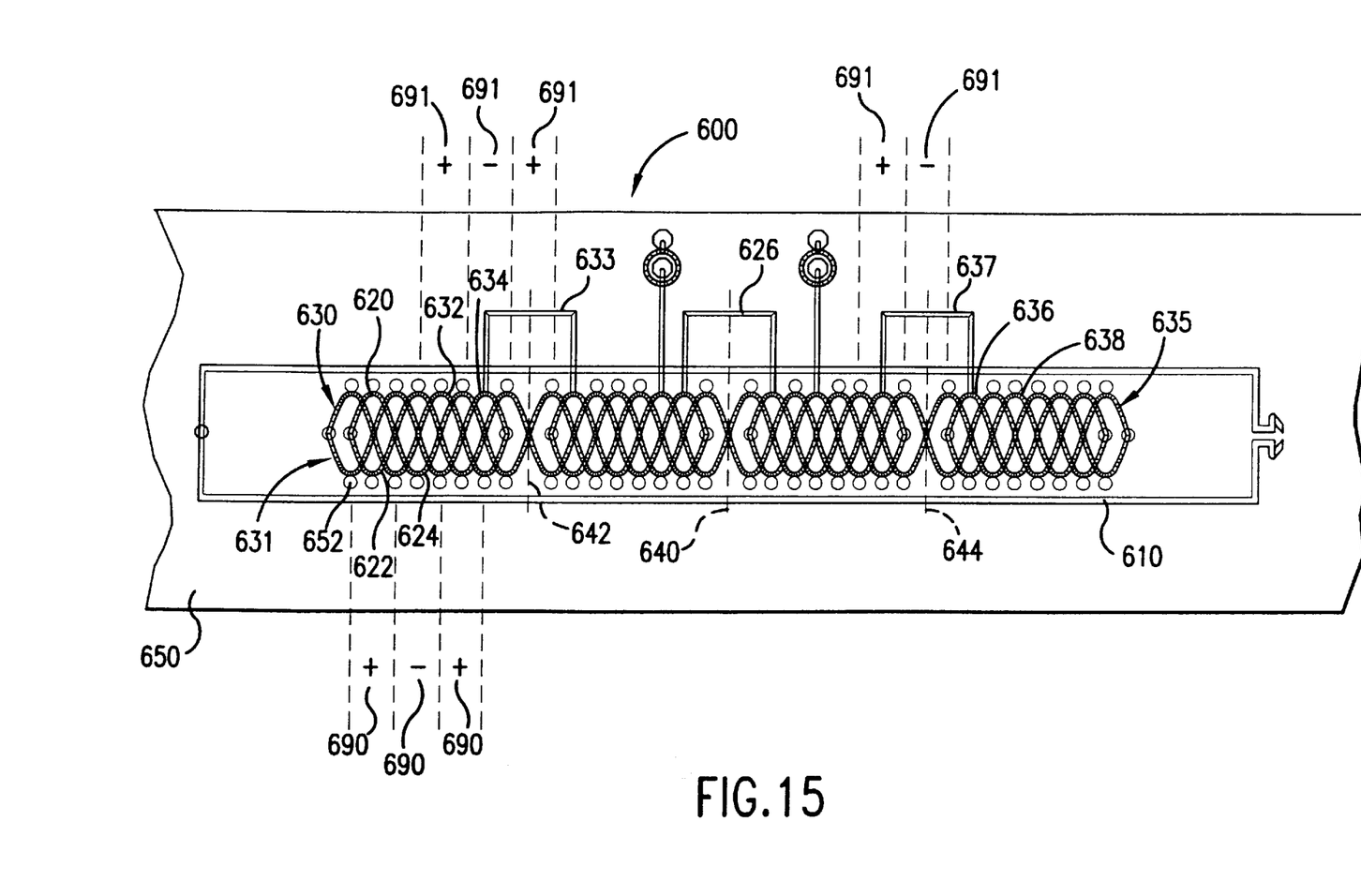
FIG. 15 is a plan view of a fifth preferred embodiment of the pitch-compensated winding of this invention.

A fifth preferred embodiment of a pitch-compensated read head 600 of this invention is shown in FIG. 15. In the read head 600, a transmitter winding 610 is shown and a first receiver winding 620 and a second receiver winding 630 are also shown. The first and second receiver windings 620 and 630 are generally positioned within the transmitter winding 610.

The first receiver winding 620 includes positive polarity loops 622 and negative polarity loops 624 arranged symmetrically about a first axis of symmetry 640, which is also the winding centroid axis. The polarity zones 690 extend the length of the winding, but not all are shown. The first receiver winding 620 also has a portion 626 extending outside the transmitter winding 610.

The second receiver winding 630 includes two subwindings 631 and 635. The polarity zones 691 extend the length of the winding, but not all are shown. The first subwinding 631 has positive polarity loops 632 and negative polarity loops 634 loops arranged symmetrically about a second axis of symmetry 642. The first subwinding 631 also has a portion 633 extending outside the transmitter winding 610. The second subwinding 635 has positive polarity loops 636 and negative polarity loops 638 arranged symmetrically about a third axis of symmetry 644. The second subwinding 635 also has a portion 637 extending outside the transmitter winding 610.

The transmitter winding 610 generates a changing magnetic flux. Each of the portions 626, 633 and 637 of the first and second receiver windings 620 and 630 includes two wires that overlay each other to avoid forming a loop. Because the portions 626, 633 and 637 do not form loops, no signal is generated in these portions by the changing magnetic flux.

The read head 600 is formed on a printed circuit board 650. A number of passthroughs 652 are provided in the printed circuit board 650 to enable portions of the receiver windings 620 and 630 to switch between the opposing faces of the printed circuit board 650. This arrangement provides insulated cross-overs between overlapping ones of the loops 622, 624, 632, 634, 636 and 638 of the first and second receiver windings 620 and 630.

Figure 16:
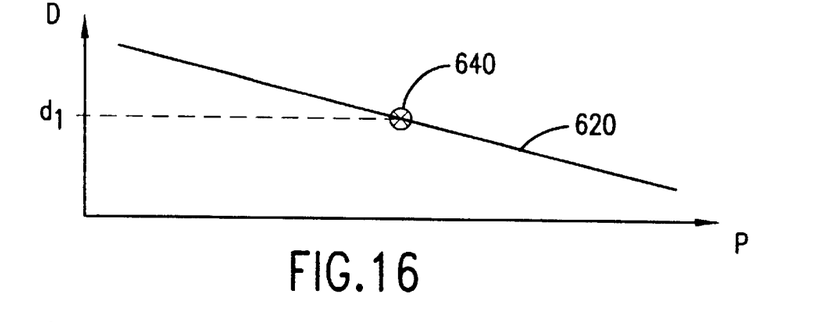
FIG. 16 shows the first winding of FIG. 15 superimposed over a plot of gap distance against position.
Figure 17:
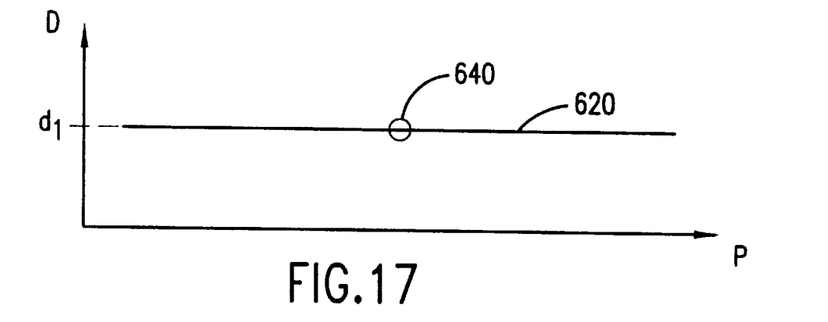
FIG. 17 shows the average gap distance of the first winding of FIG. 15.

FIG. 16 shows a side view of the first winding 620 superimposed on a graph relating a gap distance D between the first winding 620 and the scale 120 to a position P on the first winding 620 along the measuring axis 130 when pitched at the angle $\theta$. The effective gap distance between the first winding 620 and the scale 120 is $d_1$, where $d_1$ corresponds to the distance between the first winding 620 and the scale 120 at the first axis of symmetry 640, which is also the centroid axis of the winding. The winding is of the types shown in FIG. 10, only longer. The net EMF contribution across all the positive and negative loops 622 and 624 of the first winding 620 is thus zero. Thus, as shown in FIG. 16 and FIG. 17, the first winding 620 is pitch-compensated and is equivalent to a winding which is perfectly parallel to the scale 120 and spaced a distance $d_1$ away from the scale 120.

Figure 18:
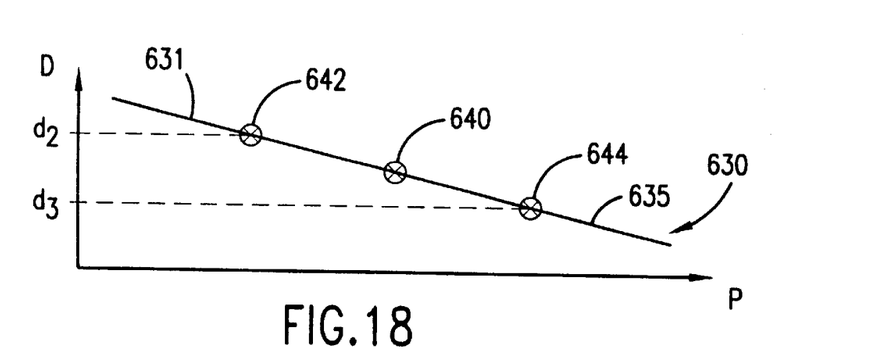
FIG. 18 shows the second winding of FIG. 15 superimposed over a plot of distance against position.

The second winding 630 is also equivalent to a winding which is perfectly parallel to the scale 120 and spaced a distance $d_1$ away from the scale 120. FIG. 18 shows a side view of the second winding 630 superimposed on a graph relating the gap distance D between the second winding 630 and the scale 120 to a position P on the first winding 630 along the measuring axis 130 when pitched at the angle θ.

Figure 19:
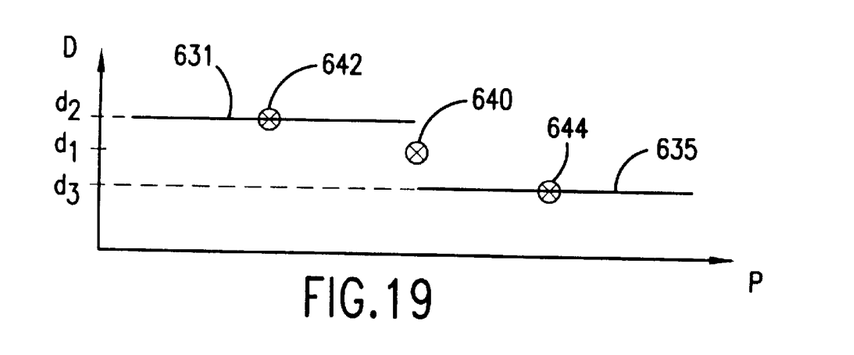
FIG. 19 shows the average distances of the first and second subwindings of the second winding of FIG. 15.

The average distance between the first subwinding 631 and the scale 120 is $d_2$, where $d_2$ corresponds to the distance between the second winding 630 and the scale 120 at the second axis of symmetry 642. The average distance between the second subwinding 635 and the scale 120 is $d_3$, where $d_3$ corresponds to the distance between the second winding 630 and the scale 120 at the third axis of symmetry 644. Thus, as shown in FIG. 19, the second winding 630 can be analyzed as two electrically connected subwindings having different average distances. However, the average of the two average distances $d_2$ and $d_3$ is equal to $d_1$.

The second winding 630 is thus equivalent to a winding which is parallel to the scale 120 and is spaced a distance $d_1$ away from the scale 120. Furthermore, each subwinding 631 and 635 is itself pitch-compensated and has an axis of symmetry. Because each subwinding 631 and 635 is pitch compensated, the two combined as shown are also pitch-compensated. The winding 630 is similar to the type shown in FIG. 12.

The first axis of symmetry 640, which is also the centroid axis of the winding 620, is also the location of the centroid axis of the winding 630. Thus, the centroids of windings 620 and 630 are aligned despite their spatial phase difference, and the matching of their output signal amplitudes will not be affected by pitch.

It will be appreciated by one skilled in the art that, with suitable signal processing means such as those detailed in incorporated references, a useful position sensor can be made from the foregoing embodiments with the roles of windings reversed. The windings 620 and 630 can be used as flux sensing windings, while the winding 610 is used as a magnetic field generator to generate a changing magnetic flux. Alternatively, the roles of the windings can be reversed and the windings 620 and 630 can be used as magnetic field generator windings to generate changing magnetic flux, while the winding 610 is used as a magnetic flux sensing winding.

Figure 20:
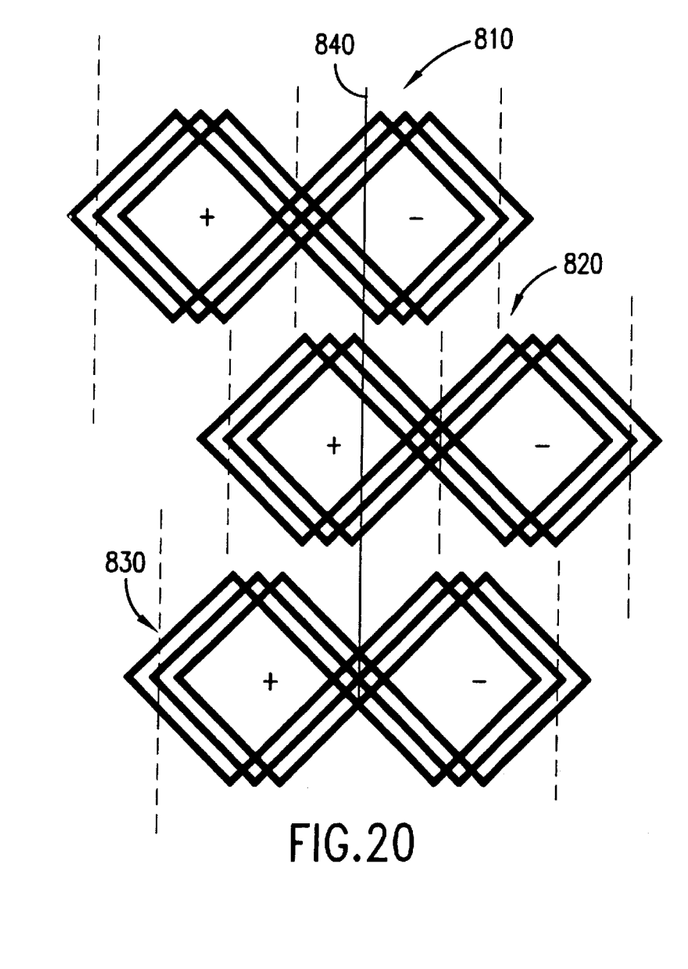
FIG. 20 is a plan view of simple windings having three different spatial phases.

FIG. 20 shows three windings 810, 820 and 830 with different spatial phases. Any one or all of these windings may be used as a magnetic field generator or as a magnetic flux sensor. The windings 810, 820 and 830 are spatially modulated sections that extend along the measuring axis and define effective flux coupling areas. The flux coupling areas are distributed relative to a plurality of polarity zones depicted by dashed lines in FIGS. 20 and 21.

Each of the windings 810, 820 and 830 has a centroid axis lying in a plane perpendicular to the measuring axis. As described above, the location of the centroid axis along the measuring axis is chosen such that when each incremental portion of all flux coupling areas is multiplied by the signed distance from that incremental portion to the centroid axis, the sum of all such products equals zero. In FIG. 20, the position of the centroid of each winding 810, 820 and 830 is the symmetry point of that winding. The centroid axes are not aligned. Therefore, the signal amplitude from these three spatial phase windings would exhibit a pitch sensitivity in the form of a signal amplitude mismatch between windings, if they were combined on a read head.

Figure 21:
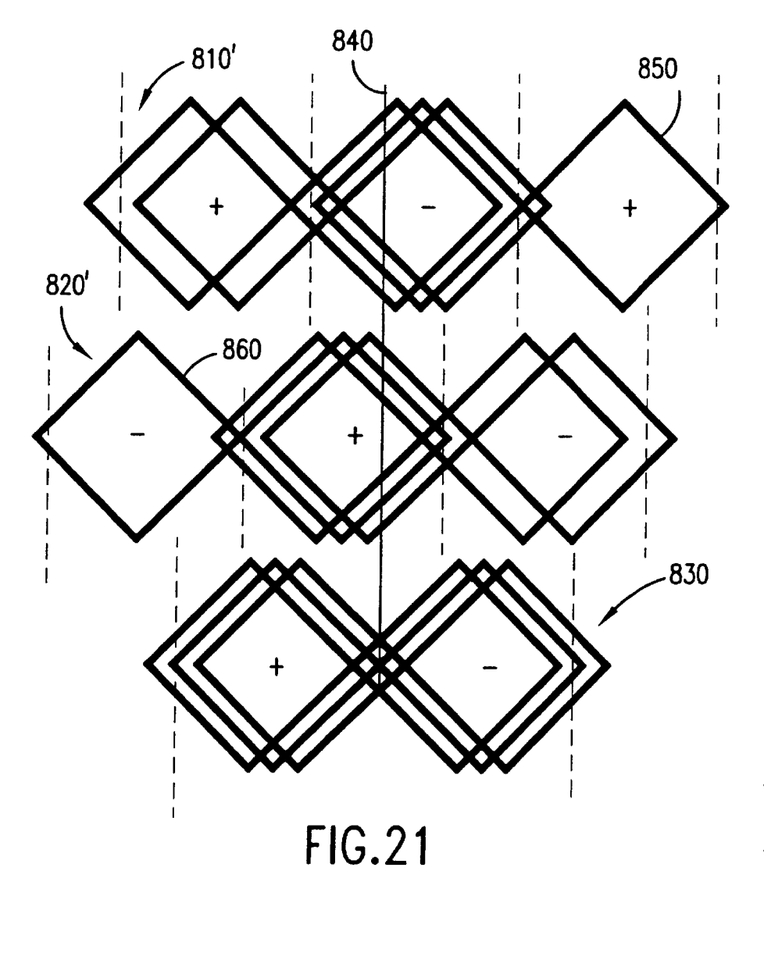
FIG. 21 is a plan view of the windings of FIG. 20 modified to align their centroid axes and diminish pitch-induced signal amplitude mismatch between the three phases.

FIG. 21 shows a modification of the three-phase winding configuration of FIG. 20, wherein one loop of the winding 810 and one loop of the winding 820 are moved by a full wavelength λ. In other words, at least one polarity zone has a total flux coupling area that is different from the total flux coupling area in an adjacent polarity zone in the windings 810' and 820'. This allows the centroid axes of the windings 810 and 820 to be shifted, without changing their spatial phase, as previously discussed with respect to FIGS. 14A–C. In this case, the winding 810' has a loop 850 that has been shifted by one wavelength λ and the winding 820' has a loop 860 that has been shifted by one wavelength λ. Therefore, the loop 850 defines one flux coupling unit area in its corresponding polarity zone while the adjacent polarity zone has three flux coupling unit areas and the next has two flux coupling unit areas.

In FIG. 21, the centroids of all windings are aligned at 840. Shifting these loops 850 and 860 while aligning the centroids effectively cancels the amplitude modulation mismatch pitch-sensitivity between the three phases, at the expense of the certain pitch errors within the individual winding signals. Maintaining winding-to-winding signal amplitude matching may be the dominant design consideration under some circumstances, and therefore this type of pitch compensation technique is sometimes useful.

Based on the detailed description outlined above, those skilled in the art will recognize that several or all pitch induced output signal errors can be eliminated with the pitch compensated induced current position transducer configurations of this invention. Furthermore, discrete flux sensors with uniform sensitivities, such as Hall Effect devices and the like, can be assigned unit sensitivities and thus assigned a unitary effective coupling area, similar to the uniform sets of individual loops disclosed herein. Thus, the pitch compensating configurations disclosed herein will be beneficial in arranging a pitch-insensitive array of such sensors.

Thus, while this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A pitch-compensated induced current position transducer, comprising:

a first member including at least one scale element arranged along a measuring axis;

a second member positioned adjacent to the first member and movable relative to the first member along the measuring axis;

at least one magnetic field generator positioned on the second member and generating a changing magnetic flux; and at least one magnetic flux sensor positioned on the second member and responsive to the changing magnetic flux to have an effective flux coupling to the at least one magnetic field generator;

wherein:
one of a) each magnetic field generator and b) each magnetic flux sensor comprises a spatially modulated section having a defined spatial phase;
the at least one scale element spatially modulates the effective flux coupling between the at least one magnetic flux sensor and the at least one magnetic field generator, each magnetic flux sensor generating an output indicative of the relative position between that magnetic flux sensor and the at least one flux scale element; and
each spatially modulated section includes at least one pitch-balancing section having an output that is insensitive to the pitch of the first member relative to the second member.

2. The pitch-compensated induced current position transducer of claim 1, wherein the spatially modulated section extends along the measuring axis and defines effective flux coupling areas distributed relative to a plurality of polarity zones extending along the measuring axis, adjacent polarity zones defining opposite polarity contributions to the output signal.

3. The pitch-compensated induced current position transducer of claim 2, wherein the pitch-balancing section comprises effective flux coupling areas distributed in the polarity zones such that the total effective flux coupling area in at least one polarity zone is different from the total effective flux coupling area in an adjacent polarity zone.

4. The pitch-compensated induced current position transducer of claim 3, wherein the total effective flux coupling area in the positive polarity zones equals the total effective flux coupling area in the negative polarity zones within the pitch-balancing section.

5. The pitch-compensated induced current position transducer of claim 2, wherein:
the pitch-balancing section comprises effective flux coupling areas distributed such that the effective flux coupling areas in the positive polarity zones together have a first centroid axis;
the effective flux coupling areas in the negative polarity zones together have a second centroid axis; and
the first and second centroid axes are at the same location on the second member along the measuring axis.

6. The pitch-compensated induced current position transducer of claim 5, wherein each centroid axis is in a plane perpendicular to the measuring axis and positioned such that when each incremental portion of all effective flux coupling areas in the same type of polarity zone is multiplied by the signed distance from that incremental portion to the centroid axis, a sum of such products equals zero.

7. The pitch-compensated induced current position transducer of claim 2, wherein a total effective flux coupling area in a polarity zone is determined by a sum of the effective flux coupling area circumscribed by each of K conductive loops arranged substantially coincident with the polarity zone, wherein K is an integer greater than or equal to zero.

8. The pitch-compensated induced current position transducer of claim 7, wherein all conductive loops are of the same size and shape and have a length along the measuring axis substantially equal to the length of the at least one scale element.

9. The pitch-compensated induced current position transducer of claim 7, wherein at least one pitch-balancing section includes at least one subset of N adjacent polarity zones with zero effective flux coupling area, N being an odd integer, wherein the at least one subset of N adjacent polarity zones is bounded by polarity zones which include effective flux coupling area.

10. The pitch-compensated induced current position transducer of claim 7, wherein a distribution of effective flux coupling areas in each at least one pitch-balancing section is symmetrical about a plane of symmetry perpendicular to the measuring axis and located at the midpoint between extrema, along the measuring axis, of the flux coupling areas included in the pitch balancing section.

11. The pitch-compensated induced current position transducer of claim 2, wherein each spatially modulated section has a centroid axis lying in a plane perpendicular to the measuring axis, the centroid positioned such that when each incremental portion of the effective flux coupling areas is multiplied by a signed distance from that incremental portion to the centroid axis, a sum of such products equals zero.

12. The pitch-compensated induced current position transducer of claim 11, wherein the centroid axes of all spatially modulated sections are at the same location on the second member along the measuring axis.

13. The pitch-compensated induced current position transducer of claim 1, wherein a distribution of effective flux coupling areas in each at least one pitch-balancing section is symmetrical about a plane of symmetry perpendicular to the measuring axis and located at the midpoint between extrema of the flux coupling areas included in the pitch balancing section.

14. The pitch-compensated induced current position transducer of claim 13, wherein a distribution of effective flux coupling areas in each spatially modulated section is symmetrical about a plane of symmetry perpendicular to the measuring axis and located at the midpoint between extrema of the flux coupling areas included in the spatially modulated section.

15. The pitch-compensated induced current position transducer of claim 14, wherein:
each spatially modulated section has a centroid axis, the centroid axis lying in a plane perpendicular to the measuring axis and positioned such that when each incremental portion of the effective flux coupling areas is multiplied by a signed distance from that incremental portion to the centroid axis, a sum of such products equals zero; and
wherein the centroid axes of the spatially modulated sections are at a same location on the second member along the measuring axis.

16. The pitch-compensated induced current position transducer of claim 1, wherein at least one spatially modulated section comprises at least two pitch-balancing sections electrically connected and aligned along the measuring axis.

17. The pitch-compensated induced current position transducer of claim 1, wherein each spatially modulated section further comprises a single pitch-balanced winding.

18. The pitch-compensated induced current position transducer of claim 17, wherein:
each spatially modulated section has a centroid axis, the centroid axis lying in a plane perpendicular to the measuring axis and positioned such that when each incremental portion of the effective flux coupling areas of that spatially modulated section is multiplied by a signed distance from that incremental portion to the centroid axis, a sum of such products equals zero; and
wherein the centroid axes of the spatially modulated sections are at a same location on the second member along the measuring axis.

19. The pitch-compensated induced current position transducer of claim 1, wherein the at least one scale element comprises at least one flux modulator, each flux modulator modifies a direct flux coupling between the at least one magnetic field generator and the at least one magnetic flux sensor.

20. The pitch-compensated induced current position transducer of claim 1, wherein the at least one scale element comprises at least one conductive loop, the at least one conductive loop inductively coupling a magnetic field generator to a magnetic flux sensor and creating a changing flux adjacent to the magnetic flux sensor in response to a changing flux of the magnetic field generator.

21. A pitch-compensated induced current position transducer, comprising:

- a first member including at least one scale element arranged along a measuring axis;
- a second member positioned adjacent to the first member and movable relative to the first member along the measuring axis;
- at least one magnetic field generator positioned on the second member and capable of changing magnetic flux; and
- at least one magnetic flux sensor positioned on the second member and responsive to the changing magnetic flux to have an effective flux coupling to the at least one magnetic field generator;

wherein:

one of a) the at least one magnetic field generator and b) the at least one magnetic flux sensor comprises a plurality of electrically separate, spatially modulated, windings;

at least one of the plurality of windings includes at least one pitch-balancing section having an output that is insensitive to the pitch of the first member relative to the second member; and the at least one scale element spatially modulates the effective flux coupling between the at least one magnetic flux sensor and the at least one magnetic field generator, each magnetic flux sensor capable of generating an output indicative of the relative position between that magnetic flux sensor and the at least one flux scale element.

* * * * *